(12) United States Patent
Grasso et al.

(10) Patent No.: US 9,128,259 B2
(45) Date of Patent: Sep. 8, 2015

(54) FIBER-COUPLED LASER WITH ADJUSTABLE BEAM-PARAMETER-PRODUCT

(71) Applicant: Coherent, Inc., Santa Clara, CA (US)

(72) Inventors: Daniel M. Grasso, San Jose, CA (US); Douglas W. Anthon, El Cerrito, CA (US)

(73) Assignee: Coherent, Inc., Santa Clara, CA (US)

( * ) Notice: Subject to any disclaimer, the term of this patent is extended or adjusted under 35 U.S.C. 154(b) by 0 days.

(21) Appl. No.: 14/452,284

(22) Filed: Aug. 5, 2014

(65) Prior Publication Data

US 2015/0049987 A1 Feb. 19, 2015

Related U.S. Application Data

(60) Provisional application No. 61/866,944, filed on Aug. 16, 2013.

(51) Int. Cl.
*G02B 6/42* (2006.01)
*B23K 26/00* (2014.01)

(52) U.S. Cl.
CPC .............. *G02B 6/4204* (2013.01); *B23K 26/00* (2013.01); *G02B 6/4206* (2013.01); *G02B 6/4296* (2013.01)

(58) Field of Classification Search
CPC .. G02B 6/4204; G02B 6/4206; G02B 6/4296; B23K 26/00

USPC ............................................................ 385/33
See application file for complete search history.

(56) References Cited

U.S. PATENT DOCUMENTS

| | | | | |
|---|---|---|---|---|
| 5,256,864 A | * | 10/1993 | Rando et al. | 235/462.14 |
| 5,370,643 A | * | 12/1994 | Krivoshlykov et al. | 606/16 |
| 5,684,642 A | * | 11/1997 | Zumoto et al. | 359/740 |
| 5,815,626 A | | 9/1998 | Kuba et al. | |
| 7,608,799 B2 | * | 10/2009 | Mikata et al. | 219/121.64 |
| 8,456,523 B2 | * | 6/2013 | Stork Genannt Wersborg | 348/90 |
| 2010/0315709 A1 | * | 12/2010 | Baer | 359/485 |
| 2011/0248005 A1 | | 10/2011 | Briand et al. | |
| 2012/0230352 A1 | | 9/2012 | Minelly et al. | |
| 2013/0016338 A1 | * | 1/2013 | Bridges et al. | 356/51 |
| 2013/0146569 A1 | | 6/2013 | Woods et al. | |

* cited by examiner

*Primary Examiner* — Akm Enayet Ullah
(74) *Attorney, Agent, or Firm* — Morrison & Foerster LLP

(57) ABSTRACT

Laser apparatus includes a laser the output of which is formed into a collimated beam then focused into a transport fiber at a particular effective numerical aperture. A parallel plate is located in the collimated beam and can be variably inclined with respect to the collimated beam for varying the effective numerical aperture of the radiation focused into the fiber. In one embodiment, a second parallel plate is located in the focused beam, and can be variably inclined with respect to the focused beam for aligning the focused beam with the optical fiber.

16 Claims, 4 Drawing Sheets

FIBER-COUPLED LASER WITH ADJUSTABLE BEAM-PARAMETER-PRODUCT

PRIORITY CLAIM

This application claims priority to U.S. Provisional Application Ser. No. 61/866,944, filed Aug. 16, 2013, the entire disclosure of which is incorporated herein by reference.

TECHNICAL FIELD OF THE INVENTION

The present invention relates in general to laser systems for material processing applications. The invention relates in particular to laser systems wherein the output of a laser is transported to material being processed via an optical fiber.

DISCUSSION OF BACKGROUND ART

In laser material processing systems in which radiation from a laser such as a solid-state-laser or a fiber-laser is transported to material processed via an optical fiber (transport-fiber) it is usual practice to optimize the laser radiation beam quality delivered from the optical fiber. A common measure of beam quality delivered from the transport fiber is the beam-parameter product (BPP). The BPP is the product of the beam-waist (smallest beam-radius) and the divergence half-angle. The smaller the BPP, the better is the beam-quality. The BPP can be thought of as a measure of the tightness with which the beam can be focused.

For a fiber delivered beam the beam-waist is essentially at the output-end of the transport fiber and is dependent inter alia, on the core diameter of the fiber. The divergence half-angle is dependent, inter alia, on the numerical aperture of the fiber, and the NA of a focused beam launched into the input-end of the fiber.

Typically in a commercial fiber-coupled laser of a particular model or series, the delivered BPP will be fixed at some optimum value. That optimum value, however, may not be the best for a particular customer's application. There is a need for a simple means for tailoring the BPP of a fiber coupled laser, if needs be, to fit a particular application.

SUMMARY OF THE INVENTION

A laser apparatus is disclosed comprising a laser delivering a beam of laser-radiation and an optical fiber for transporting the laser radiation to a workplace, the optical fiber having a core. A collimating lens is arranged to collimate the laser-radiation beam. A focusing lens is arranged to focus the collimated laser-radiation beam into the core of the optical fiber, the focusing lens having an optical axis. A first transparent plate is located in the laser radiation beam between the collimating lens and the focusing lens. The first transparent plate is tilted about an axis traverse to the optical axis such that the collimated beam is incident on the transparent plate at a non-normal incidence angle, the non-normal incidence providing transverse translation of the collimated beam with respect to the optical axis of the focusing lens.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
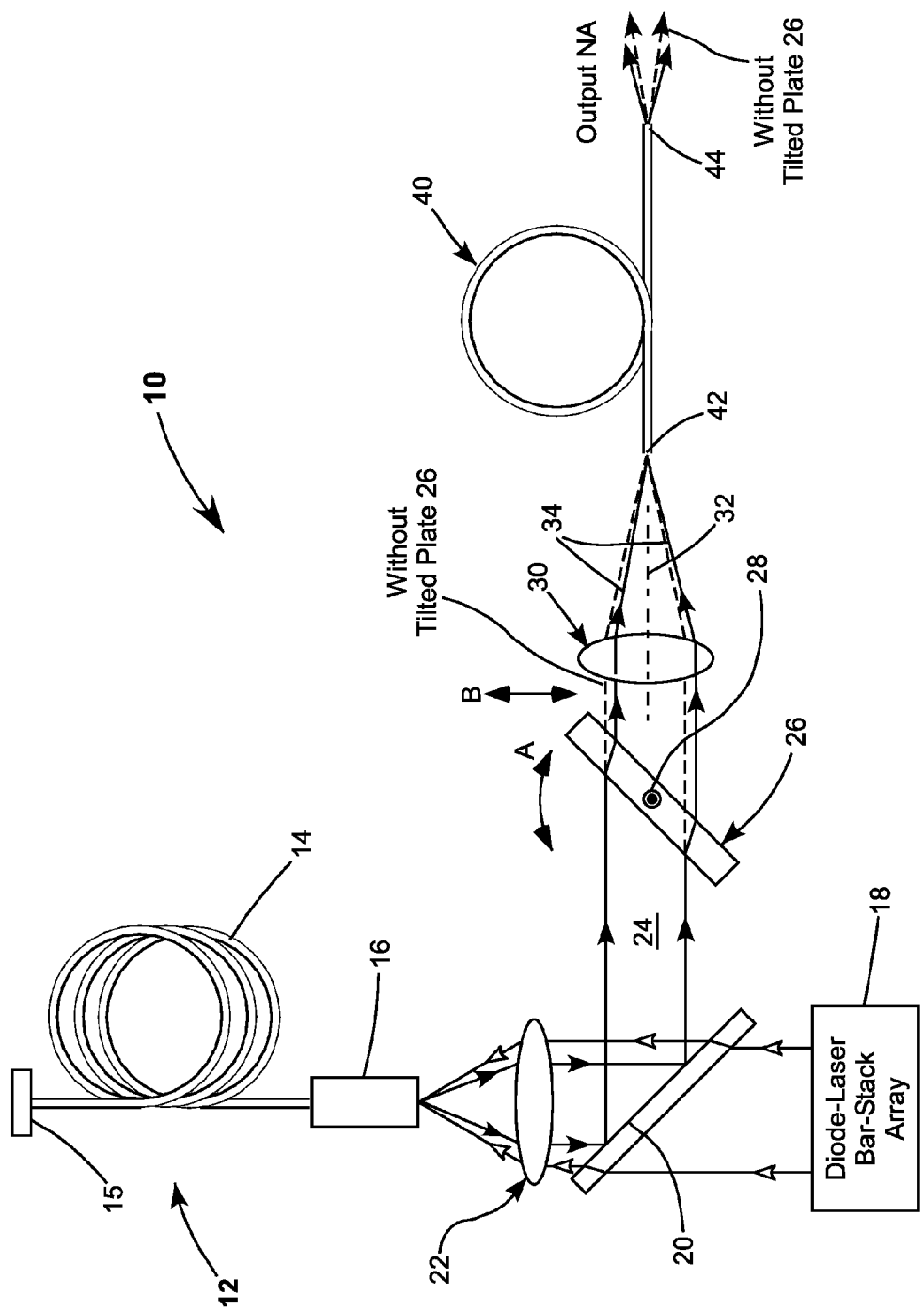
FIG. 1 schematically illustrates one preferred embodiment of a fiber coupled laser system in accordance with the present invention including a fiber laser pumped by a diode-laser bar stack array. Also illustrated are a transport fiber for transporting the output of the fiber laser to a work-piece location, a collimating lens for forming the output of the fiber laser into a collimated beam, a focusing lens for focusing the collimated beam into the transport fiber, and a first parallel transparent plate located between the collimating lens and the focusing lens and selectively tiltable about a transverse axis of the collimated beam for varying angles at which the collimated beam is focused into the transport fiber.

Referring now to the drawings, FIG. 1 schematically illustrates a preferred embodiment 10 of a fiber coupled laser apparatus in accordance with the present invention. Apparatus 10 includes a high-power, multimode, continuous wave (CW) fiber laser 12 having a multimode gain-fiber 14. Here, gain-fiber 14 is an ytterbium-doped (Yb-doped) gain fiber optically pumped by radiation from an array 18 of diode-laser bar stacks.

Pump radiation from array 18 (indicated by open arrowheads) is delivered through a dichroic mirror 20, transparent to pump radiation and reflective for laser radiation. The pump-radiation is focused into the gain-fiber by a positive lens 22. A coupler 16 on the end of the gain fiber is provided for disposing of any pump radiation that escapes the fiber cladding.

A laser resonator is formed in gain-fiber 14 by a mirror 15 at the distal end of the gain-fiber and the cleaved surface of the proximal end of the gain fiber (not visible in FIG. 1). Laser radiation is generated in the gain fiber in response to the optical pumping. In this example of a Yb-doped gain-fiber, the laser radiation wavelength is primarily in a wavelength range between about 1080 and 1120 nm. The laser-radiation (designated by solid arrowheads) exits the fiber at the proximal end thereof, and is collimated by lens 20 into a collimated beam 24. Dichroic mirror 20 reflects the collimated laser-radiation beam and directs the collimated beam toward a positive (focusing) lens 30 having an optical axis 32 aligned with the (center of) the core (not shown) in proximal end 42 of a transport fiber 40.

Located between lens 22 and lens 30 is a parallel-sided transparent plate 26. Plate 26 is selectively tiltable about an axis 28, as indicated by arrows A. Axis 28 corresponds to a transverse axis of collimated beam 24. When beam 24 is incident on plate 26 at any other than normal incidence (the plane of incidence, here, being in the plane of the drawing) beam 24 will be translated in the incidence plane, with respect to optical axis 32 of lens 30, as indicated by arrows B. The path of collimated beam 24 in the absence of plate 26, or with beam 24 normally incident on plate 26, is indicated in FIG. 1 by long-dashed lines. The beam-translation provided by plate 26 will depend on the tilt angle and plate thickness.

An effect of the translation, as can be seen in FIG. 1 is that beam 24 is focused into distal end 42 of fiber 40 as an asymmetric cone of rays 34 with a highest cone-angle greater than that of a symmetric cone of rays (dashed lines) in the absence of plate 26 (or with beam 24 normally incident on plate 26). This provides, in effect, a higher launch-NA (determined by the highest launch angle) of laser radiation into the transport fiber, than would be the case in the absence of plate 26 (or with beam 24 normally incident on plate 26). Because of a homogenizing action of the transport fiber, laser-radiation emerges at distal end 44 of transport fiber 40 in a symmetric cone of rays with a higher NA than would be the case (again indicated by dashed lines) in the absence of plate 26, or with beam 24 normally incident on plate 26.

It should be noted here that lenses 22 and 30 are depicted as single element lenses for convenience of illustration. In practice the lenses may include more than one element for providing correction of optical aberrations as is known in the art.

Figure 2:
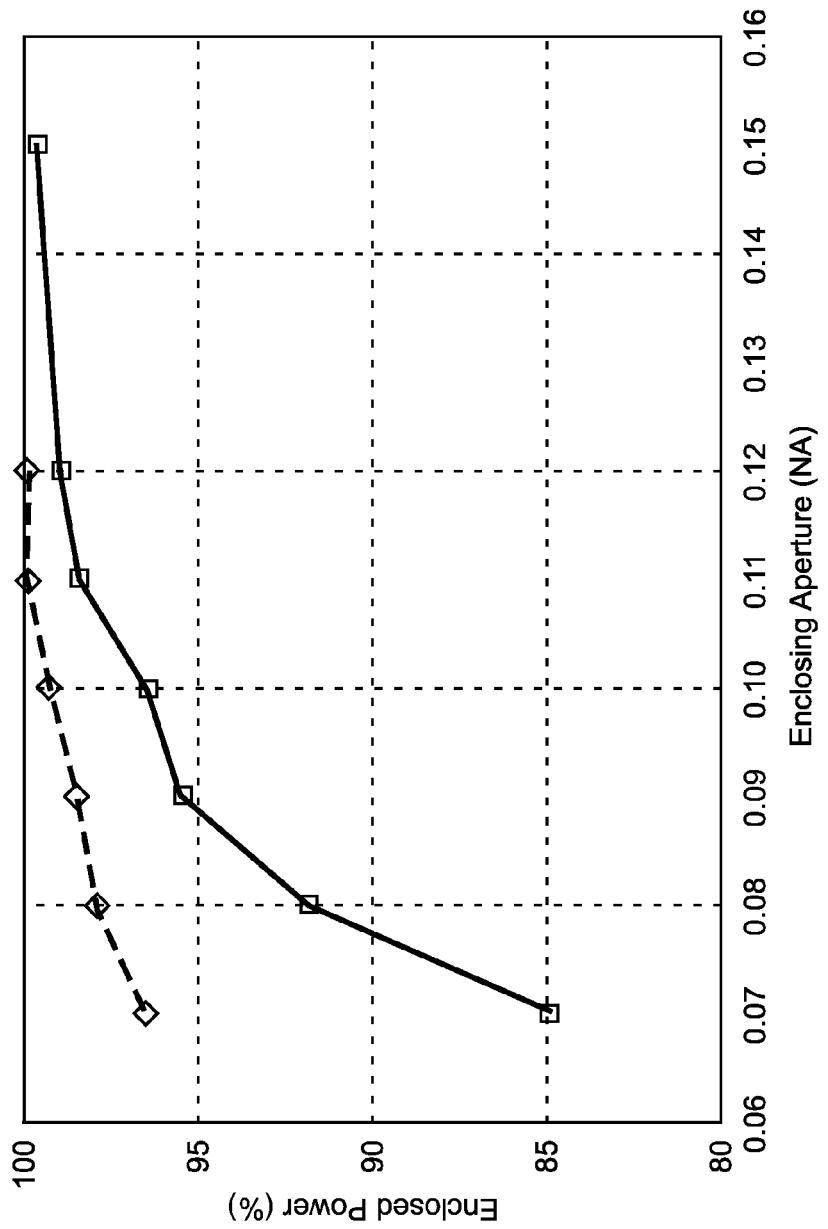
FIG. 2 is a graph schematically illustrating measured enclosed power percentage delivered from the transport fiber as a function of numerical aperture in an example of the laser system of FIG. 1 without the tiltable plate and with the tiltable plate inclined at an angel of 45° to the collimated beam.

FIG. 2 is a graph schematically illustrating measured enclosed power percentage delivered from transport fiber 40 as a function of numerical aperture in an example of the laser system of FIG. 1, without the tiltable plate (dashed curve) and with the tiltable plate inclined at an angle of 45° to the collimated beam (solid curve). In this example, lens 30 has a focal length of about 45 mm. The input beam ($1/e^2$) radius is about 2.5 mm. Plate 26 is a fused silica plate having a thickness of about 5 mm. The core (not shown) of transport-fiber 40' here, has a diameter of about 100 um. The fiber has a length of about 5 meters (m). Measurements were taken adjacent distal-end 44 of transport fiber 40 through a series of different size apertures.

It can be seen that as a result of the beam-translation introduced by plate 26, the 95% power-content increases from about NA=0.06 to slightly less than NA=0.09. In this example, that corresponds to increasing the BPP from fiber 40 from about 2.3 millimeter·milliradians (mm·mrad) up to about 3.5 mm·mrad. Regarding beam quality, there were no obvious rings or potentially problematic energy distribution features observed in the out beam of the transport fiber as a result of the BPP increase.

The present invention is described above in a context of fiber-transporting the output of a CW fiber-laser. The invention, however, is applicable to transporting the output of any laser, either CW or pulsed, the output of which can be effectively collimated. The BPP adjustment can be used for tailoring BPP to satisfy a specific application requirement, or for fine tuning BPP to a standard specification. The beam translation plate does not need be selectively variable. A thickness and inclination of the plate could be determined by calculation or prior experiment and the plate fixedly installed at the required location.

Figure 3:
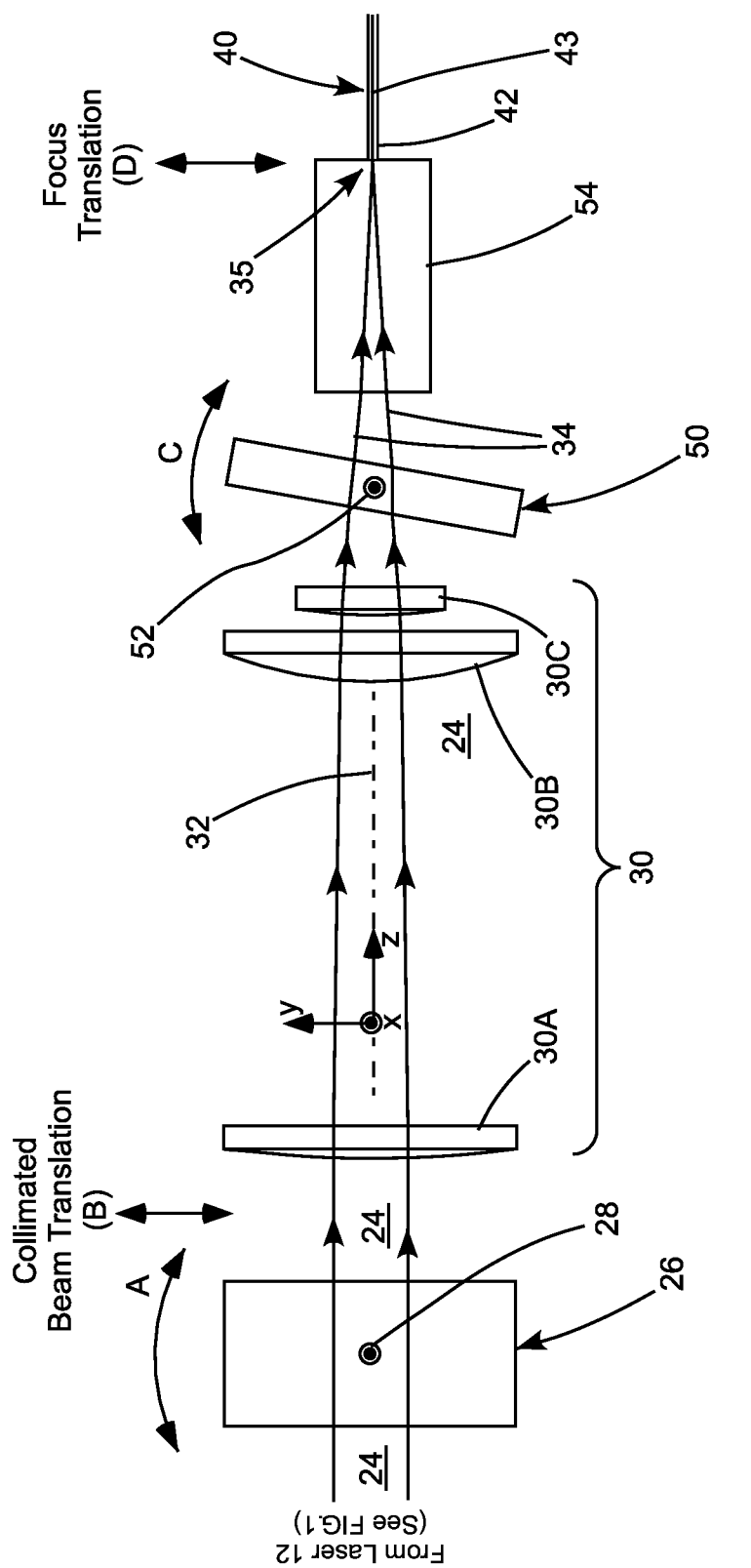
FIG. 3 schematically illustrates schematically illustrates another preferred embodiment of a fiber coupled laser system in accordance with the present invention similar to the embodiment of FIG. 1 but further including a second parallel transparent plate located between the focusing lens and the transport fiber and selectively tiltable about a transverse axis of the collimated beam for aligning the focused beam with the transport fiber, with the first transparent plate here at normal incidence to the collimated beam.

FIG. 3 schematically illustrates schematically illustrates another preferred embodiment 11 of fiber coupled laser apparatus in accordance with the present invention. similar to the embodiment of FIG. 1 but further including a second parallel transparent plate 50 located between focusing lens 30 and (distal end 42 of) transport fiber 40. In the arrangement of FIG. 3, lens 30 is a three-element lens consisting of a weak positive lens-element 30A and two stronger positive lens-elements, 30B and 30C. Other combinations of elements may be used to form lens 30 without departing from the spirit and scope of the present invention Further proximal end 42 of fiber 40 is protected from radiation damage by and end-cap 54 bonded thereto. The propagation axis (z-axis) and mutually perpendicular transverse axes (x-axis and y-axis) are depicted in the drawing for reference.

The arrangement of FIG. 3 illustrates a potential practical case where optical axis 32 of lens 30 is not exactly aligned with fiber 40. To correct for any such misalignment, plate 50 is selectively tiltable about a transverse axis 52 of the collimated beam as illustrated in the drawing by arrows C. Such tilting translates focus 35 of the focused beam 34 as indicated in the drawing by arrows D (in the y-axis direction). This permits for precise alignment of focus 35 with core 43 of fiber 40 for optimum coupling of radiation into the fiber. In the arrangement of FIG. 3, plate 26 is normally inclined to collimated beam 24 so there is no effective increase in the effective NA of beam 34. In this example the tilt-axes 28 and 52 are parallel to each other as depicted in the drawing.

Figure 4:
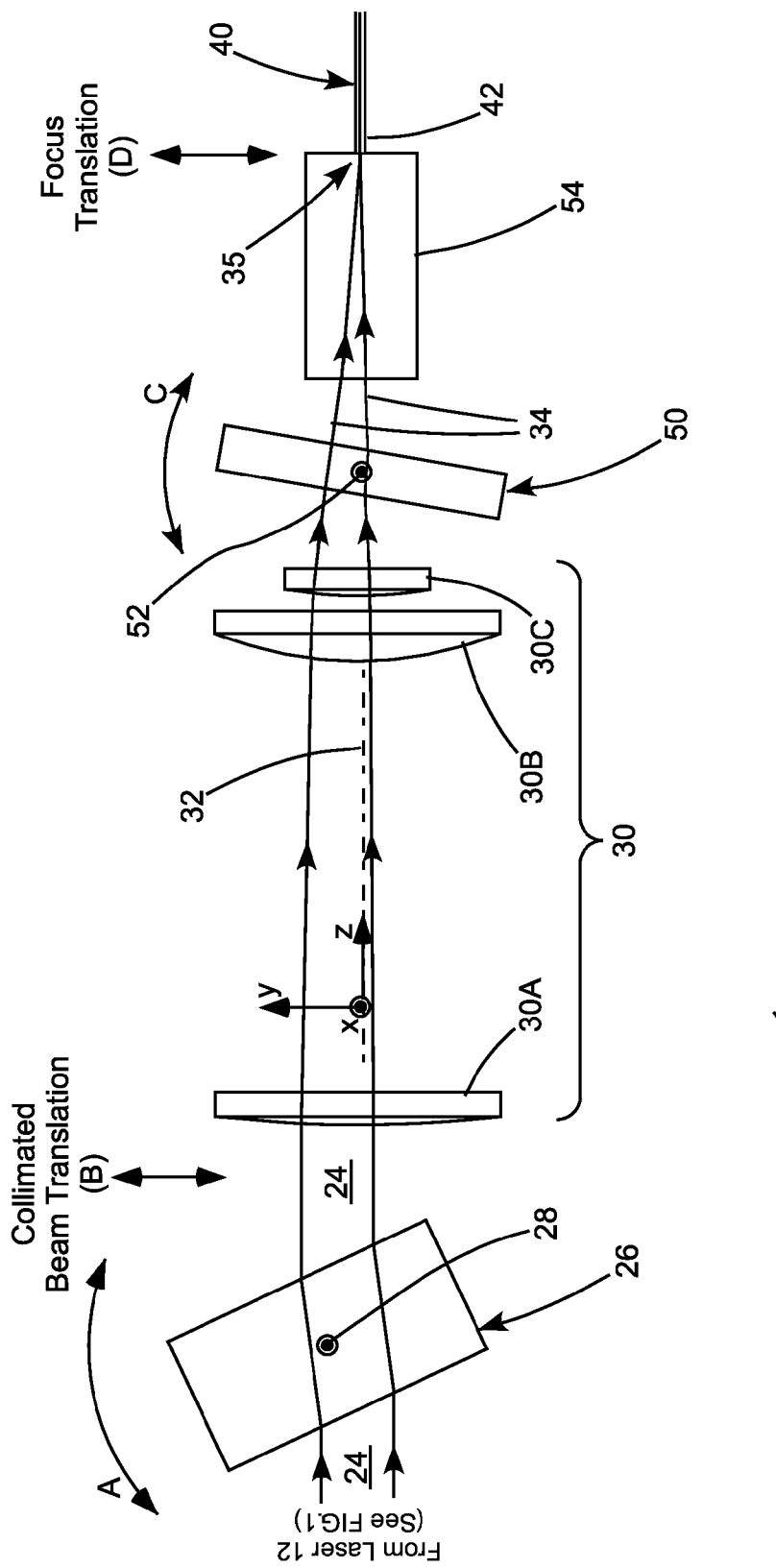
FIG. 4 schematically illustrates the embodiment of FIG. 3, but with the first transparent plate inclined non-normally to the collimated beam.

FIG. 4 schematically illustrates the apparatus of FIG. 3 but with plate 26 non-normally inclined to collimated beam 24, for increasing the effective NA of focused beam 34 as described above with reference to FIG. 1. This is achieved independent of the alignment of beam focus 35 by plate 50. The drawing of FIG. 4 is a reproduction of output of optical design software ZEMAX, available from Radiant Zemax Corporation of Redmond, Wash. Those skilled in the art may devise similar configurations using ZEMAX or comparable software without departing from the spirit and scope of the present invention.

In FIG. 4, three-element lens 30 is a 40 mm lens with a nominal NA of 0.08. Plate 26 is a fused silica plate having a thickness of 12.7 mm. Plate 26 is inclined at 25° to beam 24. The 25 degree inclination provides for an effective launch-NA of 0.127. Plate 50 has a thickness of 4 mm thick. Tilting plate 50 by ±10° translates focus 35 (in the y-axis direction) by ±220 micrometers (μm). While there will be some slight astigmatism resulting from the tilting of plate 50, calculations indicate that a point source would be imaged with an RMS radius of less than 4.9 μm. This is approximately 3.7 times as large as would be obtained in the absence of plates 26 and 50, but comparable to what has been used in other prior-art systems to successfully couple similar beams to similar fibers.

It would be possible in theory to place a tiltable plate between lenses elements (here between elements 30A and 30B). Tilting such a plate however would provide both focus-translation and launch NA increase with one dependent of the other. This would have limited practical application.

In summary the present invention is described in terms of a preferred embodiment. The invention is not limited to the embodiment described and depicted herein. Rather the invention is limited only by the claims appended hereto.

What is claimed is:

1. Laser apparatus, comprising:
 a laser delivering a beam of laser-radiation, and an optical fiber for transporting the laser radiation to a workplace, the optical fiber having a core;
 a collimating lens arranged to collimate the laser-radiation beam;
 a focusing lens arranged to focus the collimated laser-radiation beam into the core of the optical fiber, the focusing lens having an optical axis; and
 a first transparent plate located in the laser radiation beam between the collimating lens and the focusing lens, the first transparent plate being tilted about an axis traverse to the optical axis such that the collimated beam is incident on the transparent plate at a non-normal incidence angle, the non-normal incidence providing transverse translation of the collimated beam with respect to the optical axis of the focusing lens.

2. The apparatus of claim 1, wherein the tilt of the first transparent plate is selectively variable for selectively varying the non-normal incidence angle of the collimated beam on the plate, thereby selectively varying the transverse translation of the collimated beam with respect to the focusing lens.

3. The apparatus of claim 1, wherein the first transparent plate is a parallel-sided transparent plate.

4. The apparatus of claim 1, wherein the focusing lens includes a plurality of optical elements.

5. The apparatus of claim 1, further including a second transparent plate located between the collimating lens and the optical fiber, the second transparent plate being selectively tiltable about an axis transverse to the optical axis of the lens for selectively translating the beam-focus with respect to the core of the optical fiber.

6. The apparatus of claim 5, wherein the second transparent plate is a parallel sided plate.

7. The apparatus of claim 5, wherein the tilt-axes of the first and second parallel plates are parallel to each other.

8. Laser apparatus, comprising:
a laser delivering a beam of laser-radiation, and an optical fiber for transporting the laser radiation to a workplace, the optical fiber having a core;
a collimating lens arranged to collimate the laser-radiation beam;
a focusing lens arranged to focus the collimated laser-radiation beam into the core of the optical fiber, the focusing lens having an optical axis;
a first transparent plate located in the laser radiation beam between the collimating lens and the focusing lens, the first transparent plate being selectively tiltable about an axis transverse to the optical axis of the focusing lens for selectively translating the collimated beam with respect to the optical axis of the focusing lens; and
a second transparent plate located between the focusing lens and the optical fiber the second transparent plate being selectively tiltable about an axis transverse to the optical axis of the focusing lens for selectively translating the focused beam with respect to the core of the optical fiber.

9. The apparatus of claim 8, wherein the first and second transparent plates are parallel-sided transparent plates.

10. The apparatus of claim 8, wherein the focusing lens includes a plurality of optical elements.

11. The apparatus of claim 8, wherein the transverse tilt-axes of the first and second transparent plates are parallel to each other.

12. Laser apparatus, comprising:
a laser delivering a beam of laser-radiation, and an optical fiber for transporting the laser radiation to a workplace, the optical fiber having a core;
a collimating lens arranged to collimate the laser-radiation beam;
a focusing lens arranged to focus the collimated laser-radiation beam into the core of the optical fiber, the focusing lens having an optical axis; and
a first transparent plate located in the laser-radiation beam between the focusing lens and the optical fiber, the first transparent plate being selectively tiltable about an axis traverse to the optical axis for translating the focused beam with respect to the core of the optical fiber.

13. The apparatus of claim 12, further including a second transparent plate located between the collimating lens and the focusing lens and being selectively tiltable about an axis transverse to the optical axis of the focusing lens for selectively translating the collimated beam with respect to the optical axis of the focusing lens.

14. The apparatus of claim 12, wherein the first and second transparent plates are parallel-sided transparent plates.

15. The apparatus of claim 12, wherein the focusing lens includes a plurality of optical elements.

16. The apparatus of claim 12, wherein the transverse tilt-axes of the first and second transparent plates are parallel to each other.

* * * * *